Figure 1:
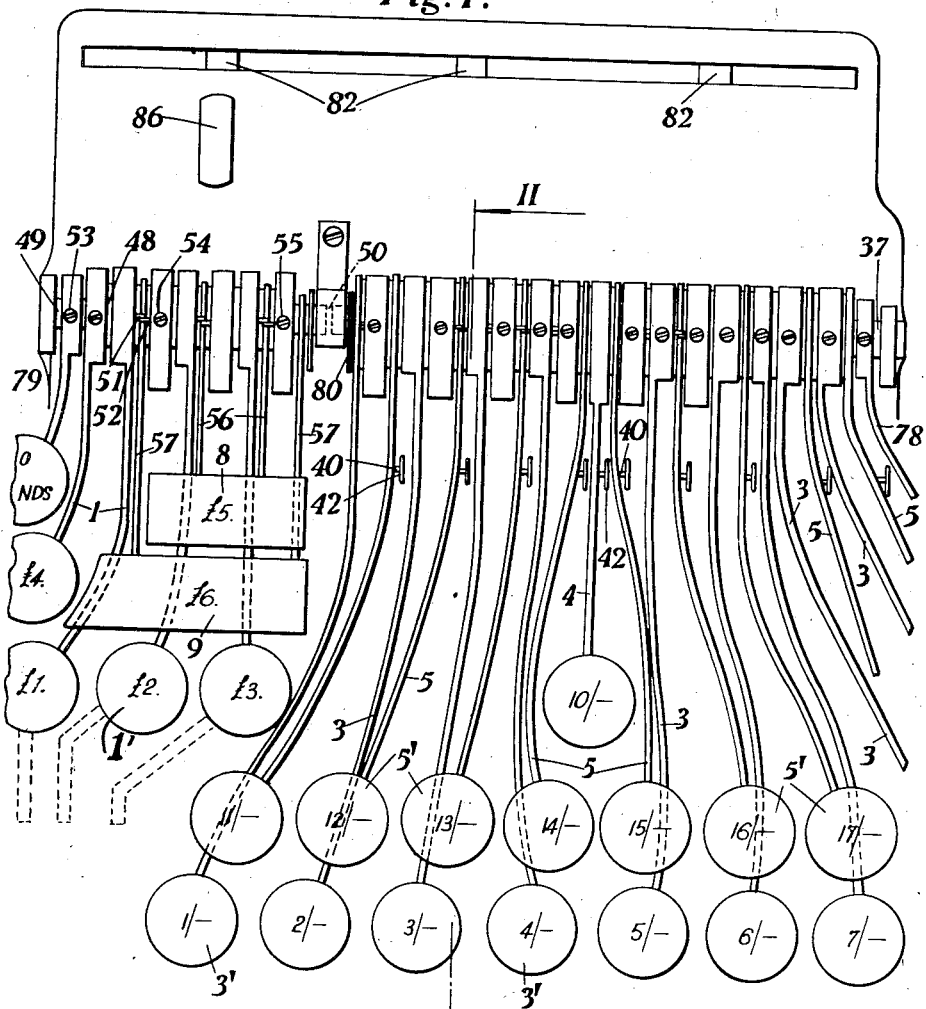

Feb. 2, 1937.   C. L. BURDICK   2,069,401
APPARATUS FOR INDICATING MONEY VALUES
Filed Feb. 14, 1934   4 Sheets-Sheet 1

INVENTOR
C. L. BURDICK
BY
ATTORNEY

Feb. 2, 1937. C. L. BURDICK 2,069,401
APPARATUS FOR INDICATING MONEY VALUES
Filed Feb. 14, 1934 4 Sheets-Sheet 2

Fig. 2.

INVENTOR
C. L. BURDICK
BY
*[signature]*
ATTORNEY

Feb. 2, 1937.   C. L. BURDICK   2,069,401
APPARATUS FOR INDICATING MONEY VALUES
Filed Feb. 14, 1934   4 Sheets-Sheet 3
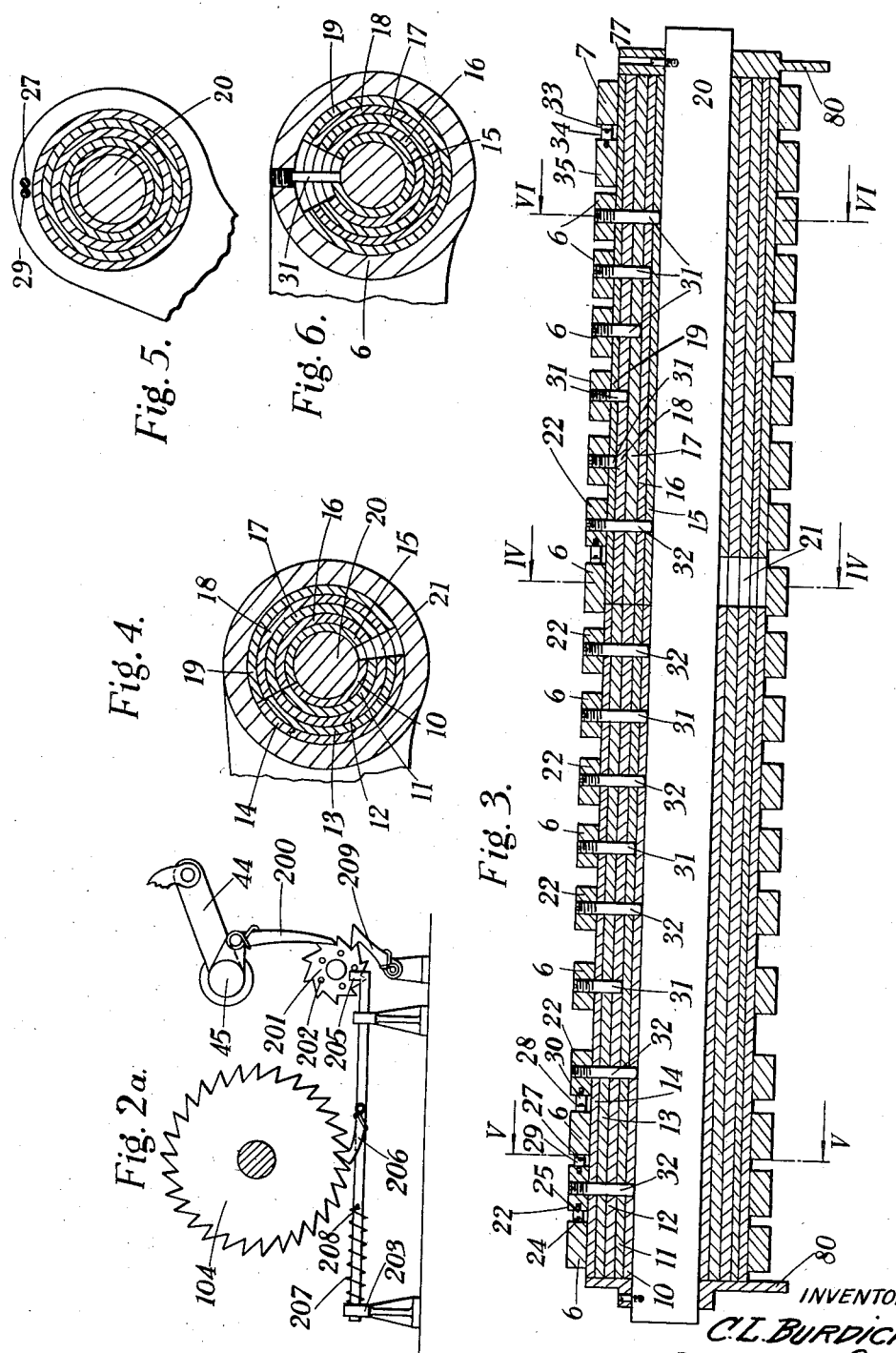
INVENTOR
C.L.BURDICK
BY
ATTORNEY Feb. 2, 1937. C. L. BURDICK 2,069,401
APPARATUS FOR INDICATING MONEY VALUES
Filed Feb. 14, 1934 4 Sheets-Sheet 4
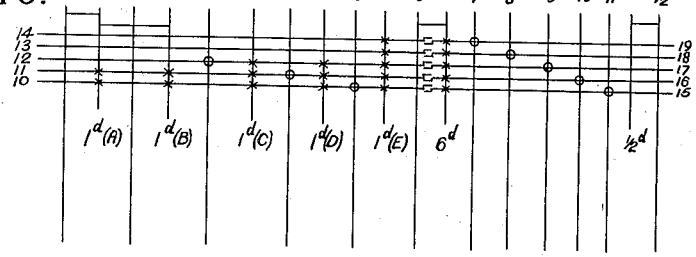
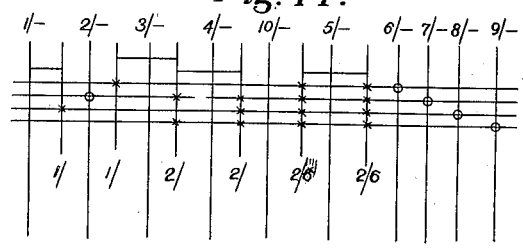
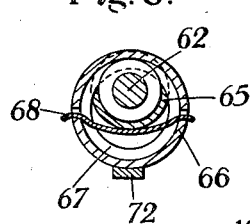
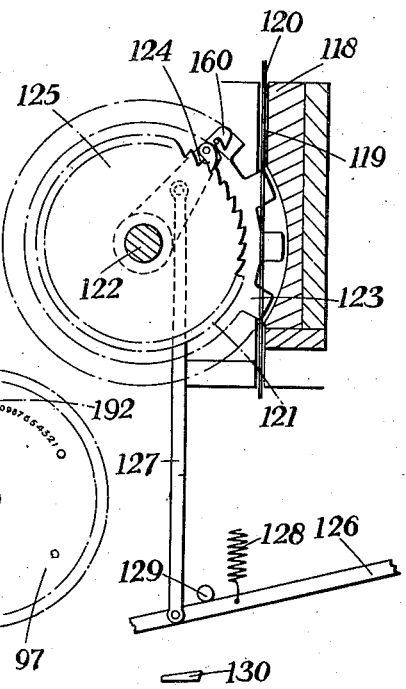
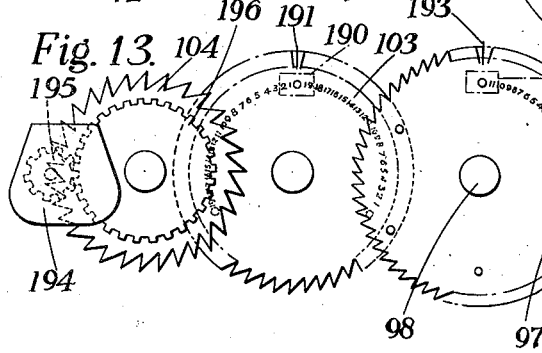
INVENTOR
C. L. BURDICK
BY
ATTORNEY Patented Feb. 2, 1937

2,069,401

UNITED STATES PATENT OFFICE 2,069,401

APPARATUS FOR INDICATING MONEY VALUES

Charles Laurence Burdick, London, England

Application February 14, 1934, Serial No. 711,251
In Great Britain February 16, 1933

16 Claims. (Cl. 164—112)

This invention relates to apparatus for producing indications of money values and is primarily intended for use in the preparation of selector members for power operated money delivering machines. A machine using such selector members is described, for example, in my co-pending United States application Ser. No. 700,928.

It is an object of the invention to provide apparatus wherein the actuation of a key or like member representing a certain money value will cause indications to be produced of the actual pieces of money which are required to make up that value.

It is also an object of the invention to provide, in perforating apparatus, the combination of means for perforating holes representing money values and mechanism for totalizing the money values represented.

Another object of the invention is to provide apparatus having means operable to produce indications of pieces of money required to make up a certain sum and means to produce indications of the balance of pieces of money indicable by the apparatus, but not punched.

A further object of the invention is to provide a card or other selector member for use in money delivering machines, and having operative perforations in positions corresponding to certain pieces of money and having "no-payment" indications adjacent to all other positions corresponding to pieces of money.

Various other objects and advantages will be apparent from the following descriptions of embodiments of the invention and novel features of the invention will be particularly pointed out in connection with the appended claims.

Figure 7:
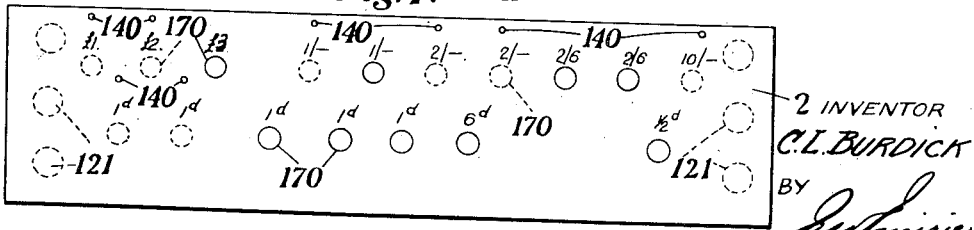

In the drawings:

Fig. 1 is a plan view showing the key board and certain other parts of the apparatus, Fig. 2 is a section on the line II—II of Fig. 1, Fig. 2a is a detached view of a detail omitted from Fig. 2, Fig. 3 is a longitudinal axial section through the selecting mechanism which controls the representation of pence, and is to a larger scale than Figs. 1 and 2, Fig. 4 is a section on the line IV—IV of Fig. 3, Fig. 5 is a section on the line V—V of Fig. 3, Fig. 6 is a section on the line VI—VI of Fig. 3, Fig. 7 shows a card treated by the apparatus, Fig. 8 is a section, to an enlarged scale, on the line VIII—VIII of Fig. 2, Fig. 9 is a similar view to that shown in Fig. 8 but with the parts in different positions, Fig. 10 is a diagram illustrating the selecting mechanism for the control of pence representation, Fig. 11 is a diagram illustrating the selecting mechanism for shilling representation, Fig. 12 is a detached elevation, partly in section illustrating a modification, and Fig. 13 is an elevation illustrating part of the totalizing mechanism.

The apparatus illustrated is designed for use in connection with payments to be made in the English currency, and is provided with banks of keys marked with different numbers of pounds, shillings and pence.

The apparatus is further designed to represent amounts in the English currency by perforating a card 2, shown in Figure 7 in one or more positions 170 predetermined to indicate various pieces of English money.

As shown in Fig. 1, levers 1 are provided, each carrying a key $1^1$ marked with a number of pounds from one to four and arranged, by means of mechanism later to be described, to operate one or more of three punches each arranged so as to be able to perforate a card 2 when correctly inserted in the apparatus in one of the positions 170 marked £1, £2 and £3, respectively. Finger plates 8 and 9 marked £5 and £6 respectively are also provided arranged to operate the levers bearing £2 and £3 keys and the £1, £2 and £3 keys, respectively.

Levers 3 are provided each carrying a key $3^1$ marked with a number of shillings from 1 to 9 and adapted to operate one or more of a number of punches each arranged so as to be able to perforate the card 2 in one of the positions marked 1/—, 2/— and 2/6d. respectively. A lever 4 is adapted to operate a punch arranged to perforate the card, in the position marked 10/—, and levers 5 carrying keys $5^1$ are adapted to operate the punch just referred to and one of the levers 3.

Levers 6 each carrying a key $6^1$ marked with a number of pence from 1 to 11 are arranged to operate one or more punches each arranged to perforate the card at one of the positions marked 1d. or 6d. and a lever 7 (shown in section in Fig. 3) is adapted to operate a punch capable of perforating the card at the position marked ½d.

The card shown in Figure 7 has a face value of £3 6s. 9½d., and those of the positions 170 at which perforations must be made in order to indicate this amount are shown in full lines, the remainder being shown dotted.

As shown for example with reference to the pence in Figures 3 and 4, two sets of concentric tubes 10, 11, 12, 13, 14 and 15, 16, 17, 18, 19 respectively are mounted for rotation about a shaft 20. At their meeting ends, the two sets of tubes are cut away to form overlapping portions: as is seen from Fig. 4, the tubes 15 to 19, hereinafter referred to as the righthand set, are cut along an axial plane, while the lefthand set is left with a projecting portion of less circumferential length, so that the space 21 shown in Figs. 3 and 4 is formed between the projecting portions of the tubes. In this way, counterclockwise rotation of any tube of the right hand set will cause corresponding rotation of the corresponding tube of the left hand set. Counterclockwise rotation of the tubes of the left hand set up to the angular extent of the space 21, however, will have no effect on the tubes of the right hand set.

The levers 6 are mounted upon the outer tubes of the two sets as shown in Figure 3, as also are tappets 22, adapted to operate punches 23. The levers are capable of angular movement about the shaft 20, and are arranged, as will now be described, to operate, upon such movement, one or more of the tappets 22, and thus of the punches 23.

The lever bearing the key marked 1d. is provided with a small screw or pin 24 (see Fig. 3) which, upon depression of the key, contacts with a screw or pin 25, carried by the adjacent tappet 22, and rotates the latter in a counterclockwise direction; this causes the corresponding punch 23 to be operated and a card placed in the apparatus at 26 is punched at the extreme left hand position of those marked 1d. in Fig. 7.

The 2d. lever is provided with screws 27 and 28 which cooperate respectively with screws 29 and 30 carried by the tappets on either side of the lever; thus, depression of the 2d. key causes operation of the two lefthand tappets and the perforation of the card at the two left hand positions marked 1d. A similar arrangement of screws is provided whereby depression of the sixpenny key causes the operation of the tappet next to it on the right and the perforation of the card at the position marked 6d.

The remaining levers 6 are provided each with a screw stud 31 by means of which each may rotate one of the tubes. For this purpose all tubes outside a tube which it is required to rotate by a particular lever are provided at the point of register with that lever, with a slot of such angular extent as to allow the stud to move the requisite distance in a counterclockwise direction without contacting the tube or the tubes to move the requisite distance in a counterclockwise direction without contacting the stud. The tube which it is required to rotate by means of a lever is provided with a slot or hole to receive the stud, which is so arranged that movement of the stud in the counterclockwise direction will cause immediate and similar movement of the tube. This part of the mechanism is illustrated in Fig. 6 which shows a section through the tubes at the 11d. lever. From this figure, it will be seen that counterclockwise movement of the stud causes movement of the inner tube only, whilst the other tubes are free to move independently of the stud.

Each of the tappets 22 is provided with a screw stud 32, which cooperates with the tubes in a manner similar to that just described, but in this case the studs, and thus the tappets, are caused to move as a result of the movement of the tubes. When a stud 32 is not intended to be operated by a tube, a slot is provided in that tube for the reception of the stud of angular extent sufficient to allow the requisite counterclockwise movement of the tube or stud independently of the other. If, on the other hand, a stud is to be operated by a tube, the slot or hole in the tube for its reception is such that counterclockwise movement of the tube causes immediate and corresponding movement of the stud. In Figure 2 there is shown a section through the tubes at the tappet operating the punch adapted to perforate the card at the right hand of the positions marked 1d. in Fig. 7; from this section it will be seen that the tappet is operated by each of the tubes with the exception of that designated by the reference 11.

The lever 7 is adapted, by means of screws 33 and 34, to operate a tappet 35 which in turn operates a punch to perforate the card in the position marked ½d.

Figure 10 is a diagram illustrating the operation of the tappets 22 by the levers 6. In this diagram the long horizontal lines represent the tubes, the short horizontal lines connections between levers and tappets by means of abutting screws (such as 24, 25). The longer vertical lines represent levers 6 (or 7) and the shorter vertical lines tappets 22 (or 35). The levers are marked with the value marked on the associated key 6¹ and the tappets with the representative value of the hole punched in the card upon their actuation. The tappets marked 1d. are further marked with the letters A, B, C, D, E respectively reading from left to right. The symbol O at the junction of a tube and a lever indicates that that tube is operated upon depression of that lever, and the symbol X at the junction of a tappet and tube indicates that that tappet is operated by that tube.

As examples, the cases of 4d. and 11d. will be taken. Depression of the 4d. key causes rotation of tube 11, which in turn causes the operation of tappets marked 1d.(A), 1d.(B), 1d.(C) and 1d.(D) so that the card is perforated at four places representing one penny. Counterclockwise rotation (as seen in Figure 4) of tube 11 has, of course, no effect upon the corresponding tube 16 of the other set. Depression of the 11d. key causes rotation of the tube 15 which causes operation of the tappet marked 6d. and also of tube 10. Counterclockwise rotation of tube 10, in turn, causes operation of tappets 1d.(A), 1d.(B), 1d.(C), 1d.(D), and 1d.(E). Depression of the 11d. key therefore results in the perforation of the card at the position representing sixpence and each of the five positions representing one penny.

The representation of sums from 1/— to 9/— is similarly effected, partly by means of abutting screws and partly by means of concentric tubes and studs. As may be seen from Figure 2, the levers 3 are mounted on the outer tube 36 of a series of concentric tubes mounted for rotation about a shaft 37. Upon this tube there are also mounted tappets 38 each arranged to operate one of a number of punches 39 each arranged to perforate the card in one of the positions marked 1/—, 2/— or 2/6d.

The method of selectively connecting the levers 3 and tappets 38 is illustrated diagrammatically in Figure 11; this diagram is similar to that shown in Figure 10 and no further explanation is considered necessary, except to point out that although no system of coaxial tubes such as 10 and 15, 11 and 16 of Figure 3 is required, two entirely independent tubes which control the representation of 2/— and 7/— respectively are arranged coaxially in order to economize space.

Mounted for rotation upon the tube 36 there are also nine levers 5. Each of these levers bears a key 5¹ marked with a number of shillings from eleven to nineteen and overlapping the shaft of the lever 6 which bears the key marked with a number of shillings which is smaller by ten. Each of these levers 5 carries a pin 40 which projects into a slot 41 in a link 42. Each of the links 42 is pivoted, as at 43, to a link 44 which is rigidly connected to a shaft 45. Rigidly carried upon the shaft 45 is a tappet 46 which is adapted to operate a punch 47 to perforate the card at the position marked 10/—.

Upon depression of a key 5¹ not only is the punch 47 operated, but also the punch or punches associated with the lever 6 which the key overlaps. Thus, upon depression of the key marked 17/— the punch 47 is operated to perforate the card at the position marked 10/— and the 7/— lever is rotated with the result that the card is also perforated at both of the positions marked 2/6d. and at the right hand position of the two marked 2/—.

The lever 4 is also mounted for free rotation upon the tube 36 and operates, upon counterclockwise rotation, the punch 47 by means of a pin 40 and link 42.

The levers 1 are mounted for rotation upon a tube 48 which in turn can rotate about a shaft 49; at its inner end, this shaft shares a common bearing 50 with the shaft 37.

The £1, £2 and £3 levers are arranged to operate corresponding tappets and punches 301 (see Fig. 14) by means of abutting screws, such as 51, 52 while the £4 lever operates the £1 and £3 tappets by means of the tube 48 and screw studs 53, 54 and 55.

The finger plates 8 and 9 are mounted on arms 56 and 57, respectively mounted for free rotation about the tube 48.

As will be seen from Figures 2 and 14, the punches 23, 39, 47 and the punches 301 associated with the pound keys and the punch 300 associated with the ½d. key, are guided in holes 302 and 303 in plates 58 and 59 respectively, which plates form part of the framework of the apparatus and registering holes are provided in a further plate 60 which, with the plate 59 forms the slot 26. Each of these punches is provided with a spring 61 which surrounds it and bears at one end against the plate 59 and at the other against a shoulder in the punch. When a punch is operated, the spring 61 is compressed and serves, upon release of the corresponding key, to return punch, tappet, tube and key lever to their initial positions.

If a card were merely punched at the positions corresponding to the pieces of money which it is desired to represent, it would be an easy matter for a person of fraudulent intent to increase the face value of the card by the addition of further perforations in appropriate positions. In order to prevent this, means are provided whereby a cancelling mark may be made against each of the representative positions on the card which it is not intended shall be perforated.

Above each of the punches already referred to in the bottom row, that is punches 23 and 300, there is mounted a smaller punch 62, while further small punches 62' are arranged above the punches 39, 47 and 301 in the top row. Each of these smaller punches has a base portion 63 having an annular groove 64 and mounted within a tube 65 which is guided in a hole 304 in the plate 58. Each punch is normally coupled to its tube 65 by means of an annular connecting member 66, (see Figs. 2, 8 and 9), inwardly projecting flanges 67 of which slide in peripheral slits or grooves in the tube 65. A small spring 68 (see Figs. 8 and 9) the ends of which project through slots in the periphery of the member 66 and the centre portion of which presses against the under side of the tube 65, tends to press the annular member in to the position shown in Fig. 8, so that one of its flanges engages the groove 64 in the base of the punch; when the member 66 is in this position, the punch is positively coupled with the tube 65 and will be moved to perforate the card whenever the tube is moved to the right as viewed in Figure 2.

Behind each of the tubes 65 there is arranged a rod passing across the apparatus and rigidly carried by members depending from one of the shafts 20, 37 or 49 at either end thereof. In Fig. 2 is shown such a rod 69 positioned behind the tubes 65 which carry punches for cancelling the positions on the card marked 1/— to 10/— and a rod 70 positioned behind the penny and halfpenny cancelling punches. As shown, the rod 69 is carried by members 81 rigidly connected to the shaft 37 and the rod 70 by members 80 carried by the shaft 20. Upon depression of any key 3 the corresponding tappet or tappets 38 contact with the rod 69 and swing it to the right as seen in Figure 2, with the result that all of the tubes 65 are moved to the right against the action of springs 71 arranged between the tubes and the plate 59 and surrounding the punches 62.

In order that the rod 69 may be operated when the lever 4 (marked 10/—) is actuated, there is rigidly carried by this lever a tappet 220 adapted to swing the rod 69.

In order that cancelling perforations shall be made in the card only at the positions required, means are provided whereby the punches 62 arranged above value punches which are to be operated are prevented from perforating the card. Within each tube 65 there is provided a spring 75, confined between the base of the punch 62 and a plug 76 in the end of the tube. These springs are so weak that upon a tube 65 being moved to the right, the punch unless positively coupled with it, will move with it only until it contacts the card 2, the resistance offered by the latter being sufficient to overcome the springs 75.

A small lever 72 is provided beneath each tube 65, pivoted to a boss 73 bolted to the plate 58. The free ends of these levers project beneath the annular coupling members 66 and each lever is formed with a depending portion 74 which normally rests on the shoulder of the large, or value, punch situated beneath it. In this way, movement of a value punch (e. g. 23 or 39) to the right will cause the corresponding lever 72 to pivot and raise the corresponding coupling member 66 to the position shown in Figure 9, from which it will be seen that the flange 67 has been removed from the groove 64 so that the punch is no longer coupled to the tube. In this way, for instance, movement of the rod 69 to the right results in the production of cancelling perforations above each of the positions on the card marked with some number of shillings with the exception of those which are perforated by a punch 39.

As will be seen from Figure 2, there is normally a slight clearance between the tappets (e. g. 22 and 38) and the rods (e. g. 69 and 70) so that the value punches have moved far enough to cause the uncoupling of the cancelling punches from the tubes before the latter begin to move. Upon a key being released and the tubes 65 returning to their initial positions under the action of the springs 71, the bases of the punches 62 are forced to the right hand end of the tubes by the springs 75 so that the flanges of the coupling members may again slip into the grooves 64 and couple the tubes and punches.

In order that the requisite cancelling punches may always be operated, arms 77, 78 and 79 respectively are carried rigidly by the shafts 20, 37 and 49 and bear keys marked "No pence", "No shillings", and "No pounds" respectively. Depression of one of these keys results in the counterclockwise rotation of one of the shafts 20, 37 or 49 and consequent swinging to the right of one of the rods (e. g. 69 or 70). If no pounds, shillings or pence are to be represented, the appropriate "No value" key is depressed which results in the swinging to the right of the corresponding rod (70, 69 or the rod situated behind the cancelling punches for the pounds) and the production of cancelling perforations above each of the positions in the card marked with numbers of pounds, shillings or pence as the case may be. Rotation of the tubes 65 may be prevented by tongues formed on the bosses 73 and engaging grooves in the tubes, or keys may be provided for this purpose where the tubes pass through the plate 58.

In Fig. 7, perforations made by the cancelling punches are shown at 140.

During the perforating operations, the card 2 is retained in the apparatus by means of bell crank levers 82. These are mounted on a shaft 83, a spring 84 being provided normally to maintain them in the position shown in Fig. 2 in which their one end prevents the passage of the card downwards through the slot. The other end of the bell crank situated on the left hand side of the apparatus as seen in Figure 1 projects beneath a rack rod 85, which projects above the apparatus and is provided with a hand plate 86. This rack rod is bored centrally to receive a smaller upright rod 88 over which it slides and is guided when depressed against the action of a spring 87. If desired, the rod 88 could be made integral with the rod 85 and pass through holes in the base of the apparatus so that the rod 85 could be operated by a treadle instead of the hand plate 86. Upon the completion of the perforation of the card, the operator depresses the rod 85 with the result that the bell cranks are swung to allow the card to drop from the slot 26. At the same time, rack teeth 89 on the rod 85 engage a pinion 90 mounted on a shaft 91. This shaft carries, at either end, a member 92 having a rubber surfaced face 93, which, upon rotation of the shaft 91 engages the card and ejects it from the apparatus.

In order to provide a check upon the amount of money represented by the perforations made by the apparatus, totalizing mechanism, illustrated in Figs. 2, 2a and 13 is provided. Each of the penny levers 6 is provided with a depending finger 94 arranged to limit the angular movement of the lever by contact with a stop 95 provided on the base of the apparatus. Upon each of these fingers 94 there is pivoted a spring pressed pawl 96, adapted, upon counterclockwise rotation of the lever, to engage a tooth of a ratchet wheel 97 mounted rigidly on a shaft 98 and to rotate the wheel through an angular distance equivalent to a number of teeth equal to the number of pence marked on the key $6^1$ carried by the lever.

In the same way, fingers 99 and 100 carried by the shilling and pound levers respectively, carry pawls 101 and 102 arranged to rotate wheels 103 and 104 through tooth distances equal to the number of shillings or pounds marked on the keys carried by the individual levers. One of the wheels 97 carries, against every twelfth tooth, a projection 105. These projections are shown dotted in Fig. 2, and are arranged, in turn, to contact with a member 106. This member 106 is guided by two pins 107 and 108 which engage slots 109 and 110 respectively in the member; the member further has a projecting portion 111 which is held in contact with the wheel 103 by a spring 112. Upon the wheel 97 rotating when one of the projections 105 is in contact with the member 106, the latter is moved and causes the wheel 103 to move to the extent of one tooth, whereupon the projection 105 moves past the member 106, which is allowed to return under the influence of the spring 112. In this way for every twelve pennies which are registered by means of the keys 6, the shilling totalizing wheel 103 is moved on to indicate one shilling. Similarly projections 113 and a member 114 are provided whereby the wheel 104 is moved on to indicate an extra pound every time the wheel 103 moves through twenty tooth spaces.

Visual indication of the total sum represented by the collective actuation of the key levers is provided for on the lefthand side of the apparatus as seen in Figure 2. As shown in Figure 13, the wheels 97 and 103 situated on this side of the apparatus are marked with equally spaced numerals; on the wheel 97 the numerals used run from 0 to 11 and recur every 30°. There is thus provided a number of numerals equal to the number of teeth on the wheel, and the number of odd pence in the total represented by the apparatus may be exhibited by way of a window or the like 190 provided in the side of the apparatus, an indicating arrow 191 also being provided. In the same way the wheel 103 is provided with numerals from 0 to 19 recurring every 120° and a window 192 and arrow 193 are also provided. The total of pounds is given by a Veeder counter 194 driven from the shaft of the wheels 104 by means of a pinion 195 meshing with a pinion 196 mounted on that shaft and having the same number of teeth as the wheels 104.

In order that the number of the ten shilling representations made may be taken account of in the total number of pounds shown by the counter 194, mechanism is provided whereby every two actuations of the tappet 46 causes the wheel 196 to be rotated through an angular distance equal to one tooth. For this purpose, the shaft 45 carries a pawl 200, spring pressed into engagement with a ratchet wheel 201, shown in Fig. 2, and provided with axially projecting pins 202; these pins are equally spaced round the ratchet wheel and there are half as many of them as there are teeth on the wheel. Carried slidably in bearings 203 upstanding from the base of the apparatus is a bar 204 (see Figs. 2 and 2a), having at one end an upstanding portion 205 adapted to be engaged in turn by each of the pins 202. Pivotally carried by the bar is a pawl 206 spring pressed into engagement with the teeth of one of the wheels 104. A spring 207 is provided, between one of the bearings 203 and a projection 208 on the bar and tends to push the bar to the right; in order to prevent the wheel 201 being rotated under the action of this spring, there is provided a spring pressed holding pawl 209.

Upon the shaft 45 being rotated by means of one of the links 44, the pawl 200 rotates the wheel 201 through one tooth space: assuming the totalizing mechanism to be at zero, such rotation of the wheel will cause a pin 202 to engage the bar 204, move it to the left and hold it, the pawl 206 slipping over one tooth of the wheel 104. The subsequent rotation of the shaft 45, and thus of the wheel 201, will cause the pin 202 to slip off the part 205 of the bar and allow the latter to return under the action of the spring 207, rotating the wheel 104 through one tooth space by means of the pawl 206. If desired, markings may be provided on the wheel 201 or on the rod 204 to indicate whether or not an odd ten shillings is to be added to the total shown by the mechanism shown in Fig. 13. Similar totalizing mechanism may be provided for halfpennies.

If it is required, instead of perforating articles such as cards, to perforate a continuous strip or the like, the apparatus just described may be adapted for this purpose by a slight modification such as is shown in Fig. 12. In this form, the plate 60 of the frame is replaced by a plate 118 between which and the plate 59 a narrow slot 119 is formed for the passage of a continuous strip 120. This strip is provided, near its edges with holes 121, shown dotted in Fig. 7, and a pair of wheels 211, mounted fast upon either end of a shaft 122, have teeth 123 adapted to engage these holes and pass the strip through the apparatus upon the wheels being rotated.

The rotation of the wheel is effected by means of a spring pressed pawl 124 carried by an arm 160 and engaging a ratchet wheel 125 carried by the shaft 122. The arm 160 is mounted for free rotation about the shaft 122 and is connected to a treadle 126 by a pivoted link 127. A spring 128 is provided for the return of the treadle, and of the pawl and stops 129 and 130 are provided to limit the movement of the treadle in either direction. The distance between these stops and the pitch of the teeth 123 and of the holes 121 are such that the downward stroke of the treadle causes one set of positions 170, similar to those marked on the card 2, to be replaced by the succeeding set.

It will be understood of course that the passage of the continuous strip 120 through the apparatus may be effected by any other suitable mechanism in place of the treadle, such, for example, as a hand crank or power means: or the release of separate cards may be by treadle, crank or other means.

It will further be understood that the apparatus may easily be adapted for use with the decimal system of currency; in fact, certain points, notably the totalizing system, will be easier to carry out when using decimal currency.

The invention is not, of course, limited to the specific features of construction above set forth. The totalizing, for example, might be effected by providing special shafts or tubes about which the finger key levers revolve, abutments on the shafts or tubes being normally held against stops by means of springs. In order to render them capable of a totalizing action, the tubes or shafts could be provided with gear segments meshing with pinions on the shafts of ratchet counters and abutments on the key levers contact with pins on the tubes or shafts and rotate them through distances proportional to the values marked on the individual keys.

Again, the perforations may be in any form, such as numerals or other distinguishing symbols. Indeed, it is not essential that the representations produced by the apparatus be perforations; for example, the apparatus might be arranged selectively to print a card or slip of paper with certain symbols or in one or more predetermined positions upon the depression of a key marked with the value to be represented; or, in the case of a selector member for use in an electrically operated machine, an insulating member might be selectively rendered conducting, or vice versa, at one or more predetermined positions upon the depression of a key.

I claim:—

1. In apparatus for producing recordings of money values, the combination of keys representing each number of each unit of money value to be recorded, and means operable upon the actuation of a key to produce a separate recording representing each of the actual pieces of money which make up the required number of the unit in question.

2. Apparatus for producing indications of money values having keys each representing a monetary value and perforating means adapted to be operated by actuation of a key to produce separate perforations in a manner predetermined to represent separately each of the actual pieces of money required to make up the amount represented by the said key.

3. In perforating apparatus the combination of keys each representing a monetary value, perforating devices operable upon the actuation of a key to produce separate perforations in a manner predetermined to represent separately each of the actual pieces of money required to make up the amount represented by the key actuated and mechanism for totalizing the money values represented by perforations so made.

4. Apparatus for producing indications of money values having keys representing each number of each unit of money value up to the capacity of the machine, means operable upon the actuation of a key to produce an indication of each of the actual pieces of money to be paid out to make up the amount represented by the key actuated and means to produce indications of what pieces of money indicatable by the apparatus are not to be paid out.

5. Apparatus for producing indications of money values comprising a plurality of concentric tubes, a plurality of key levers mounted for rotation about the axis of said tubes, means connecting each of said key levers to a different one of said tubes, indication-producing devices, and means connecting each of said tubes to a different one or to a different combination of more than one of said indication-producing devices.

6. Apparatus for producing indications of money values comprising a plurality of concentric tubes, key levers mounted for rotation about the axis of said tubes, indication-producing devices, an actuating device for each of said indication-producing devices mounted for rotation about the axis of said tubes, slots in said tubes, a projection carried by each of said key levers and adapted to impart motion from said key lever to one of said tubes by engagement with the edge of the slot therein, and a projection carried by each of said actuating devices and adapted to receive motion from one or more of said tubes by engagement with the edges of the slots therein, and to transmit it to said actuating devices and the associated indication-producing devices.

7. Apparatus for producing indications of money values comprising a key representing each number of each unit of money value up to the capacity of the machine, a punch representing each piece of money required to make up any sum within the capacity of the machine, and means operatively connecting each of said keys to punches each representing one of the pieces of money required to make up the amount represented by the key.

8. Apparatus for producing indications of money values comprising a key representing each number of each unit of money value up to the capacity of the machine, a value punch representing each piece of money required to make up any sum within the capacity of the machine, means operatively connecting each of said keys to value punches representing the pieces of money required to make up the amount represented by the key, a cancelling punch situated adjacent each of said value punches, and means operable upon the depression of a key to actuate the cancelling punches adjacent all value punches which are not operatively connected to that key but are operatively connected to keys representing numbers of the same unit of money value.

9. Apparatus for producing indications of money values as claimed in claim 8, wherein a key is provided for each unit of money value and is operatively connected to all of the cancelling punches situated adjacent value punches representing pieces of money of that unit for the operation thereof independently of the keys provided representing the individual numbers of that unit of money value.

10. Apparatus for producing recordings of money values comprising keys each representing a monetary value, devices for producing recordings each adapted to indicate a piece of money of certain value, means operatively connecting each of said keys to recording producing devices representing each of the actual pieces of money required to make up the monetary value represented by the key, and means for totalizing the amounts represented by the actuation of keys.

11. A perforating machine comprising keys each representing a number of a unit of money value, value punches, means for the selective operation of said value punches by said keys, a cancelling punch situated adjacent each of said value punches, an actuating member for each of said cancelling punches, means operatively connecting the actuating member of each of said cancelling punches to all of said keys, and means operable upon the actuation of a value punch to uncouple the adjacent cancelling punch from its actuating member.

12. Apparatus for producing upon a sheet indications of money values, comprising keys representing each a money value, means operable upon actuation of any key to produce upon the sheet a separate indication of each piece of money required to make up the amount represented by the key, means to retain the sheet within the apparatus and means to eject it therefrom.

13. In apparatus for producing indications of money values upon a sheet, a pivoted member, spring means tending to urge said pivoted member into position to retain the sheet in position to receive the indications, a shaft, a member mounted eccentrically upon said shaft and having a rubber surfaced face, actuating means adapted to swing said pivoted member from the sheet retaining position, and means connecting said actuating means to said eccentric member to cause the latter to swing to bring its rubber-surfaced face into contact with the sheet and eject it from the apparatus.

14. Apparatus for producing indications of money values comprising a key representing each number of each unit of money value up to the capacity of the machine, a punch for every piece of money required to make up any sum within the capacity of the machine, and means operatively connecting each key with punches representing the actual pieces of money required to make up the sum represented by the key.

15. A perforating machine comprising keys each representing a number of a unit of money value, value punches, means for the selective operation of said value punches by said keys, a cancelling punch situated adjacent each of said value punches, an actuating member for each of said cancelling punches, means for coupling each cancelling punch to its actuating member, springs tending to maintain said coupling means in coupling position, and cam means connected to each of said value punches adapted upon actuation of the value punch to uncouple the adjacent cancelling punch from its actuating member.

16. A perforating machine comprising a key for each number of each unit of money value to be indicated, a value punch for each actual piece of money required to make up any sum which the machine is capable of indicating, a cancelling punch adjacent each of said value punches, an actuating member for each of said cancelling punches, means selectively connecting said keys to said value punches, means connecting each of said keys to the actuating members of all cancelling punches which are adjacent to value punches connected to keys representing some number of the same unit of money value, means operable upon the actuation of any of said value punches to uncouple the adjacent cancelling punch from its actuating member, and a key for each unit of money value represented by said first mentioned keys, each of said second mentioned keys being operatively connected to the actuating means of all cancelling punches adjacent value punches which are operatively connected to keys representing members of the same unit of money value.

CHARLES LAURENCE BURDICK.